United States Patent
Salort et al.

(10) Patent No.: US 10,450,446 B2
(45) Date of Patent: Oct. 22, 2019

(54) CURABLE RUBBER COMPOSITIONS CONTAINING STYRENE/ALPHA-METHYL STYRENE CO-OLIGOMERS

(71) Applicant: Fina Technology, Inc., Houston, TX (US)

(72) Inventors: Fabien Salort, Balagny sur Therain (FR); Jean-Marc Monsallier, Saint-Martin-Longueau (FR)

(73) Assignee: FINA TECHNOLOGY, INC., Houston, TX (US)

( * ) Notice: Subject to any disclaimer, the term of this patent is extended or adjusted under 35 U.S.C. 154(b) by 156 days.

(21) Appl. No.: 15/495,295

(22) Filed: Apr. 24, 2017

(65) Prior Publication Data

US 2018/0305526 A1   Oct. 25, 2018

(51) Int. Cl.
| | |
|---|---|
| C08L 9/06 | (2006.01) |
| C08L 9/00 | (2006.01) |
| B60C 1/00 | (2006.01) |
| C08F 212/08 | (2006.01) |
| C08L 21/00 | (2006.01) |

(52) U.S. Cl.
CPC ......... *C08L 9/06* (2013.01); *C08L 9/00* (2013.01); *C08L 21/00* (2013.01)

(58) Field of Classification Search
None
See application file for complete search history.

(56) References Cited

U.S. PATENT DOCUMENTS

| | | | | |
|---|---|---|---|---|
| 2,940,830 A | * | 6/1960 | Thornhill | B82Y 30/00 106/482 |
| 3,036,053 A | * | 5/1962 | Doak | C08F 212/08 526/209 |
| 3,367,995 A | * | 2/1968 | Masaaki | C08F 279/02 525/316 |
| 3,630,981 A | * | 12/1971 | Finfinger et al. | C08F 212/12 524/524 |
| 3,654,250 A | * | 4/1972 | Davis | C08F 212/12 524/474 |
| 3,725,506 A | * | 4/1973 | Bolte | C08F 212/08 526/173 |
| 3,912,793 A | * | 10/1975 | Horiie | C08F 297/042 525/258 |
| 3,932,332 A | * | 1/1976 | Douglas | C08L 21/00 524/524 |

(Continued)

FOREIGN PATENT DOCUMENTS

WO   2004022644 A1   3/2004

OTHER PUBLICATIONS

International Search Report and Written Opinion for International Application No. PCT/US2018/028550, dated Aug. 7, 2018, 10 pages.

(Continued)

*Primary Examiner* — Peter A Salamon
(74) *Attorney, Agent, or Firm* — Albert Shung

(57) ABSTRACT

A low molecular weight co-oligomer containing styrene and α-methyl styrene in bound form and having a ring and ball softening point not greater than 50° C. is useful in modifying the properties of a diene elastomer-based curable rubber composition capable of being used to manufacture tire treads.

20 Claims, 2 Drawing Sheets

(56) References Cited

U.S. PATENT DOCUMENTS

| | | | | | |
|---|---|---|---|---|---|
| 3,956,426 | A | * | 5/1976 | Schepers | C08G 81/022 525/271 |
| 4,097,557 | A | * | 6/1978 | Cunningham | C08F 297/04 525/250 |
| 4,427,837 | A | * | 1/1984 | Tung | C08F 297/04 525/314 |
| 4,525,532 | A | * | 6/1985 | Tung | C08L 25/16 525/314 |
| 4,645,796 | A | * | 2/1987 | Beyer | C08L 25/02 525/75 |
| 4,755,576 | A | * | 7/1988 | Zabrocki | C08F 212/12 526/342 |
| 5,266,642 | A | * | 11/1993 | Piejko | C08F 285/00 525/244 |
| 5,854,367 | A | * | 12/1998 | Salvetat | C08F 12/04 526/347.1 |
| 5,877,249 | A | * | 3/1999 | Lambotte | B60C 1/0016 152/905 |
| 6,525,133 | B1 | * | 2/2003 | Wideman | B60C 1/0016 152/209.1 |
| 7,253,225 | B2 | * | 8/2007 | Labauze | B60C 1/0016 524/313 |
| 8,815,995 | B2 | * | 8/2014 | Vest | B60C 1/0016 524/492 |
| 9,441,098 | B1 | * | 9/2016 | Isitman | C08L 9/00 |
| 2011/0160337 | A1 | * | 6/2011 | Ishino | B60C 1/0016 523/157 |
| 2012/0157568 | A1 | * | 6/2012 | Sandstrom | B60C 1/0016 523/156 |
| 2013/0237659 | A1 | * | 9/2013 | Recker | B60C 1/0016 524/526 |
| 2013/0331498 | A1 | * | 12/2013 | Miyazaki | B60C 1/0016 524/493 |
| 2014/0121316 | A1 | * | 5/2014 | Monsallier | C08K 3/36 524/526 |
| 2017/0051135 | A1 | * | 2/2017 | Sandstrom | C08L 91/00 |

OTHER PUBLICATIONS

Brunauer et al., "Adsorption of Gases in Multimolecular Layers", Journal of the American Chemical Society, vol. 60, pp. 309-319, 1938.

Hydrocarbon Resin for Tire Rubber Compounding, downloaded at httpwww.thankyouchem.comproducts01enid4.html, Jul. 20, 2017.

* cited by examiner

CURABLE RUBBER COMPOSITIONS CONTAINING STYRENE/ALPHA-METHYL STYRENE CO-OLIGOMERS

FIELD OF THE INVENTION

The invention pertains to curable rubber compositions based on diene elastomers which are useful in the manufacture of tire treads.

DISCUSSION OF THE RELATED ART

It is recognized that a composition to be used to manufacture the tread of a summer tire has to provide a good hysteresis between wet traction and rolling resistance. Such hysteresis is difficult to obtain because of certain opposite dynamic properties: the energy consumption is needed for wet adherence/breaking and an energy restitution is needed in order to decrease the rolling resistance of a tire. Accordingly, the development of methods by which curable tire tread compositions can be modified so as to provide improved hysteresis between wet traction and rolling resistance would be highly desirable.

BRIEF SUMMARY OF THE INVENTION

It has now been found that low molecular weight co-oligomers of styrene and α-methyl styrene having relatively low ring and ball softening points (≤50° C.), when incorporated into diene elastomer-based curable compositions, are capable of imparting enhanced hysteresis characteristics to tire treads preparing from such curable compositions.

Various exemplary aspects of the invention may be summarized as follows:

Aspect 1: A curable rubber composition comprising:
a) at least one diene elastomer;
b) at least one reinforcing filler;
c) at least one styrene/α-methyl styrene co-oligomer having a number average molecular weight of from about 300 to about 600 g/mol and a ring and ball softening point not greater than 50° C.;
d) a curative system capable of curing the curable rubber composition when heated.

Aspect 2: The curable rubber composition of Aspect 1, wherein the at least one diene elastomer is selected from the group consisting of polybutadienes, polyisoprenes, copolymers of butadiene and vinyl aromatic monomers, copolymers of isoprene and vinyl aromatic monomers, and combinations thereof.

Aspect 3: The curable rubber composition of Aspect 1 or 2, wherein the at least one reinforcing filler includes at least one of silica and carbon black.

Aspect 4: The curable rubber composition of any of Aspects 1-3, additionally comprising at least one silane.

Aspect 5: The curable rubber composition of any of Aspects 1-4, wherein the ring and ball softening point of the at least one styrene/α-methyl styrene co-oligomer is at least 25° C.

Aspect 6: The curable rubber composition of any of Aspects 1-5, wherein the curative system is comprised of at least one of elemental sulfur, organosulfur compounds and combinations thereof.

Aspect 7: The curable composition of Aspect 6, wherein the curative system is additionally comprised of an accelerator, curing aid or activator or a combination thereof.

Aspect 8: The curable rubber composition of any of Aspects 1-7, wherein the curable rubber composition is comprised of from 5 to 50 parts by weight of the at least one styrene/α-methyl styrene co-oligomer per 100 parts by weight of the at least one diene elastomer.

Aspect 9: The curable rubber composition of any of Aspects 1-8, wherein the at least one styrene/α-methyl styrene co-oligomer is comprised of from 30 to 70% by weight styrene and from 30 to 70% by weight α-methyl styrene, the amounts of styrene and α-methyl styrene totaling 100% by weight.

Aspect 10: The curable rubber composition of any of Aspects 1-9, wherein the at least one styrene/α-methyl styrene co-oligomer has a glass transition temperature not greater than 15° C. as measured by ISO 11357-2.

Aspect 11: The curable rubber composition of any of Aspects 1-10, wherein the at least one styrene/α-methyl styrene co-oligomer has a number average molecular weight of from about 300 to about 500 g/mol.

Aspect 12: The curable rubber composition of claim 1, wherein the at least one styrene/α-methyl styrene co-oligomer has a weight average molecular weight of from about 600 to about 1300 g/mol.

Aspect 13: The curable rubber composition of any of Aspects 1-12, wherein the at least one styrene/α-methyl styrene co-oligomer has a polydispersity of from 1 to about 1.5.

Aspect 14: The curable rubber composition of any of Aspects 1-13, wherein the at least one styrene/α-methyl styrene co-oligomer has a polydispersity of from 1 to about 1.3.

Aspect 15: The curable rubber composition of any of Aspects 1-14, wherein the at least one styrene/α-methyl styrene co-oligomer has been prepared by cationic or anionic polymerization.

Aspect 16: A cured composition obtained by curing of the curable rubber composition of any of Aspects 1-15.

Aspect 17: A tread, comprising the cured composition of Aspect 16.

Aspect 18: A tire, comprising the tread of Aspect 17.

Aspect 19: A method of making a tread, comprising molding and curing the curable rubber composition of any of Aspects 1-15.

Aspect 20: A method of decreasing the rolling resistance of a tire having a tread, wherein the tread is obtained by curing a curable rubber composition comprised of at least one diene elastomer, at least one reinforcing filler and a curative system, wherein the method comprises additionally including in the curable rubber composition an effective amount of at least one styrene/α-methyl styrene co-oligomer having a number average molecular weight of from about 300 to about 600 g/mol and a ring and ball softening point of not more than 50° C.

DETAILED DESCRIPTION OF CERTAIN EMBODIMENTS OF THE INVENTION

Styrene/α-Methyl Styrene Co-Oligomers

Figure 1:
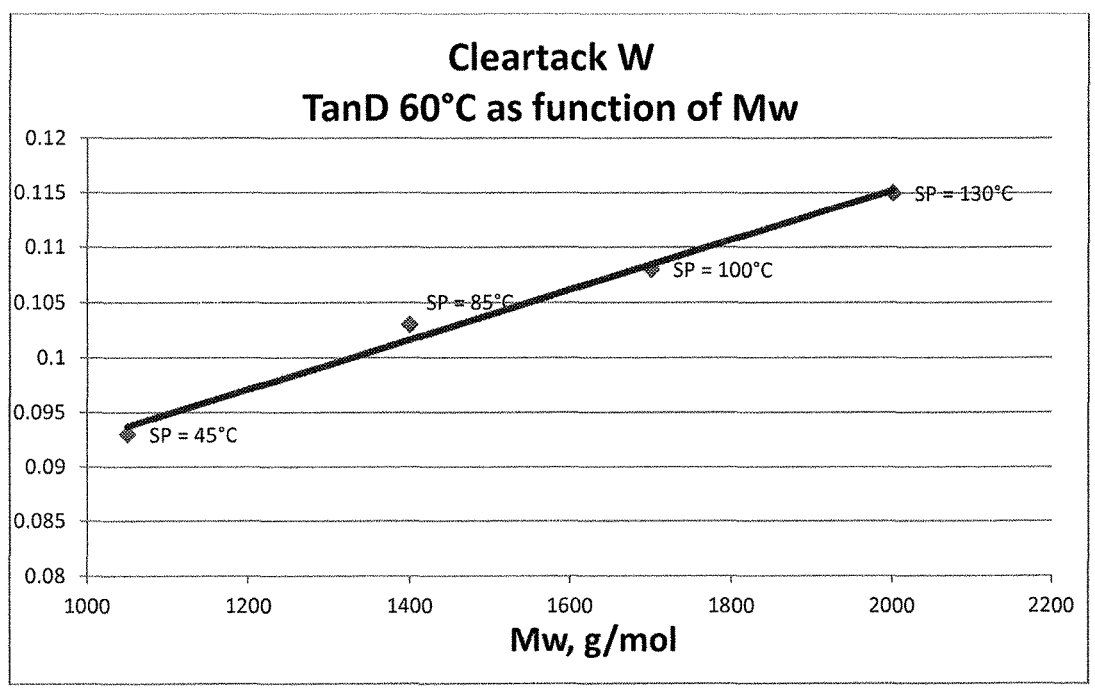
FIG. 1 is a graphical representation of certain experimental results shown in Table 1 of the Examples.

Suitable co-oligomers for use in accordance with the present invention are relatively low molecular weight copolymers of styrene and α-methyl styrene. In particular, it has been found that it is advantageous to employ, as a component of a curable rubber composition based on diene elastomer to be used as a tire tread composition (compound), a co-oligomer obtained by copolymerization of styrene and α-methyl styrene monomers which has a ring and ball softening point (also referred to as the "Ring and Ball Temperature") of not more than 50° C. The ring and ball softening point may be measured using the ASTM D6090-12 test method. In another embodiment, the ring and ball softening point of the co-oligomer is at least 25° C. In yet another embodiment, the co-oligomer has a ring and ball softening point of from 40° C. to 50° C.

A general correlation exists between the ring and ball softening point of a styrene/α-methyl styrene co-oligomer and its glass transition temperature (Tg), in the sense that as the ring and ball softening point increases the Tg also increases by about the same magnitude. The glass transition temperature of a polymer or oligomer is a thermodynamic property, whereas the ring and ball softening point is the temperature at which a polymer or oligomer starts to flow. Typically, the Tg of a co-oligomer is approximately 40-50° C. lower than the co-oligomer's ring and ball softening point.

Accordingly, in certain embodiments of the invention, the styrene/α-methyl styrene co-oligomer has a glass transition temperature (Tg) of not greater than 15° C. as measured by ISO 11357-2. In another embodiment, the Tg of the co-oligomer is at most 10° C. In yet another embodiment, the co-oligomer has a Tg of from 0° C. to 5° C.

The co-oligomer may have a number average molecular weight (Mn) of from about 300 to about 600 g/mole. The weight average molecular weight (Mw) of the co-oligomer may be from about 500 to about 1500 g/mol. The molecular weight characteristics of the co-oligomers may be measured using size exclusion chromatography (expressed in polystyrene equivalent using adequate Mark-Hauwink coefficients) in accordance with ISO 16014-2. In other embodiments, the number average molecular weight of the styrene/α-methyl styrene co-oligomer is from about 350 to about 500 g/mole. The styrene/α-methyl styrene co-oligomer may have, in various embodiments of the invention, a weight average molecular weight of from about 600 to about 1300 g/mole. The polydispersity of the co-oligomer may be, for example, from 1 to about 1.5, from 1 to about 1.4, or from 1.05 to 1.3. The co-oligomer may contain, on average, from about 2.5 to about 18, or from about 2.5 to about 9, or from about 2.5 to about 5 or from about 2.5 to about 4 oligomerized units in total of styrene and α-methyl styrene monomer.

The relative amounts of bound (polymerized) styrene and α-methyl styrene in the co-oligomer may be varied as may be desired to order to impart advantageous properties or characteristics to the co-oligomer (e.g., a ring and ball softening point of not more than 50° C. and/or a Tg of not more than 15° C.). For example, in various embodiments of the invention, the weight ratio of styrene:α-methyl styrene in the co-oligomer is from 20:80 to 80:20, from 30:70 to 70:30, or from 40:60 to 60:40.

Combinations or mixtures of different styrene/α-methyl styrene co-oligomers may be utilized in the curable compositions of the present invention; preferably, any such combination or mixture possesses the above-mentioned attributes with respect to molecular weight, glass transition temperature, styrene content, α-methyl styrene content and so forth.

Co-oligomers of styrene and α-methyl styrene having the above-described characteristics and suitable for use in the present invention may be prepared using any of the methods conventionally known in the art, including by both cationic and anionic copolymerization. For example, a Lewis acid may be used to initiate cationic polymerization of a mixture of styrene and α-methyl styrene. Suitable Lewis acids include, but are not limited to, $SnCl_4$, $AlCl_3$, $BF_3$, and $TiCl_4$. Although these Lewis acids alone are able to induce polymerization, the reaction generally occurs much faster with a suitable cation source. The cation source can be water, an alcohols, or a carbocation donor such as an ester or an anhydride. In these systems. the Lewis acid is referred to as a coinitiator while the cation source is the initiator. Upon reaction of the initiator with the coinitiator, an intermediate complex is formed which then goes on to react with the monomer unit(s).

The amount of styrene/α-methyl styrene co-oligomer in the curable composition may be varied as may be appropriate, depending upon the characteristics of the co-oligomer(s), the other components of the curable composition and the desired properties of the composition once cured, among other parameters. Generally speaking, however, the curable composition may comprise from 5 to 50 phr styrene/α-methyl styrene co-oligomer. In other embodiments, from 10 to 40 phr, from 15 to 35 phr, or from 20 to 30 phr styrene/α-methyl styrene co-oligomer is present in the curable composition.

Diene Elastomer

One or more diene elastomers are utilized in compositions of the present invention. Suitable diene elastomers for this purpose are generally high in molecular weight (e.g., a number average molecular weight $M_n$ above 80,000 Da) and contain sites of residual unsaturation which are capable of being cured (crosslinked) when the composition is heated to a sufficiently high temperature. In the context of the present invention, "diene elastomer" is understood to mean an elastomer (rubber) resulting at least in part from the polymerization of one or more diene monomers (monomers bearing two double carbon-carbon bonds, whether conjugated or not). Suitable diene elastomers include both homopolymers and copolymers.

A diene elastomer suitable for use in the curable rubber compositions according to the invention may be "highly unsaturated," such as a polymers obtained from conjugated diene monomers which has a greater than 50% molar content of polymerized units of conjugated diene monomers.

According to one embodiment of the invention, the curable rubber composition may comprise one or more diene elastomers having a Tg between −110° C. and −40° C. Mixtures of diene elastomers having different glass transition temperatures may also be employed. For example, the curable rubber composition may comprise a first diene elastomer having a Tg of from −110° C. to −75° C. and a second diene elastomer having a Tg different from that of the first diene elastomer and in the range of from −75° C. to −40° C.

According to various aspects, highly unsaturated diene elastomers are utilized, in particular homopolymers obtained by homopolymerization of a conjugated diene monomers having 4 to 12 carbon atoms and/or copolymers obtained by copolymerization of one or more conjugated dienes with each other or with one or more vinyl aromatic compounds having 8 to 20 carbon atoms.

Suitable conjugated dienes are, in particular, 1,3-butadiene, 2-methyl-1,3-butadiene, 2,3-di(C1-C5 alkyl)-1,3-butadienes such as, for instance, 2,3-dimethyl-1,3-butadiene, 2,3-diethyl-1,3-butadiene, 2-methyl-3-ethyl-1,3-butadiene, 2-methyl-3-isopropyl-1,3-butadiene, aryl-1,3-butadienes, 1,3-pentadiene and 2,4-hexadiene. Suitable vinyl aromatic compounds are, for example, styrene, ortho-, meta- and para-methyl styrene, the commercial mixture "vinyltoluene", para-t-butylstyrene, methoxystyrenes, chlorostyrenes, vinylmesitylene, divinylbenzene and vinylnaphthalene and combinations thereof.

The copolymers may, for example, contain between 99% and 20% by weight of diene units (in bound/polymerized form) and between 1% and 80% by weight of vinyl aromatic units (in bound/polymerized form). The elastomers may have any microstructure, which is a function of the polymerization conditions used, in particular of the presence or absence of a modifying and/or randomizing agent and the quantities of modifying and/or randomizing agent used. The elastomers may, for example, be block, statistical (random), sequential or micro-sequential elastomers, and may be prepared in dispersion or in solution; they may be coupled and/or starred or alternatively functionalized with a coupling and/or starring or functionalizing agent.

Particular embodiments of the present invention use polybutadienes, including those having a content of 1,2-units between 4% and 80%, or those having a content of cis-1,4 [bonds] of more than 80%, polyisoprenes, butadiene-styrene copolymers, including those having a styrene content of between 5% and 50% by weight and more particularly, between 20% and 40%, a content of 1,2-bonds of the butadiene fraction of between 4% and 65%, and a content of trans-1,4 bonds of between 20% and 80%, butadiene-isoprene copolymers including those having an isoprene content of between 5% and 90% by weight and a glass transition temperature of between −40° C. and −80° C., isoprene-styrene copolymers and in particular those having a styrene content of between 5% and 50% by weight and a Tg of between −25° C. and −50° C. In the case of butadiene-styrene-isoprene copolymers, those that are suitable include, but are not limited to, those having a styrene content of between 5% and 50% by weight and more particularly, between 10% and 40%, an isoprene content of between 15% and 60% by weight, and more particularly between 20% and 50%, a butadiene content of between 5% and 50% by weight, and more particularly between 20% and 40%, a content of 1,2-units of the butadiene fraction of between 4% and 85%, a content of trans-1,4 units of the butadiene fraction of between 6% and 80%, a content of 1,2-plus 3,4-units of the isoprene fraction of between 5% and 70%, and a content of trans-1,4 units of the isoprene fraction of between 10% and 50%, and more generally any butadiene-styrene-isoprene copolymer having a Tg of between −20° C. and −70° C.

The diene elastomer(s) of the composition according to particular embodiments of the present invention may be selected from the group of highly unsaturated diene elastomers that include polybutadienes (BR), synthetic polyisoprenes (IR), natural rubber (NR), butadiene copolymers, isoprene copolymers and mixtures thereof.

Such copolymers may, in other embodiments, be selected from the group that includes butadiene-styrene copolymers (SBR), butadiene-isoprene copolymers (BIR), isoprene-styrene copolymers (SIR), isoprene-butadiene-styrene copolymers (SBIR) and mixtures thereof.

The curable rubber compositions used to prepare tire treads and other products in accordance with the invention may contain a single diene elastomer or a mixture of several diene elastomers, the diene elastomer(s) possibly being used in association with any type of synthetic elastomer other than a diene elastomer, or even with polymers other than elastomers, for example thermoplastic polymers.

The high molecular weight diene-based elastomers may be selected from the group consisting of polybutadienes, polyisoprenes, copolymers of butadiene and vinyl aromatic monomers, copolymers of isoprene and vinyl aromatic monomers, and combinations of two or more such diene elastomers. For example, elastomers that may be used in the present invention include styrene-isoprene-butadiene rubber (SIBR), styrene-isoprene rubber (SIR), isoprene-butadiene rubber (IBR). Natural rubber can also be used in addition to synthetic rubbers which may include neoprene (polychloroprene), polybutadiene (including cis 1,4-polybutadiene), polyisoprene (including cis-1,4-polyisoprene), butyl rubber, halobutyl rubber such as chlorobutyl rubber or bromobutyl rubber, acrylonitrile and methyl methacrylate rubbers, as well as ethylene/propylene terpolymers, also known as ethylene/propylene/diene monomer (EPDM), and in particular, ethylene/propylene/dicyclopentadiene terpolymers. Additional examples of rubbers which may be used include carboxylated rubbers, as well as silicon-coupled and tin-coupled star-branched polymers.

In one embodiment, the curable rubber composition includes at least one polybutadiene having a relatively high 1,4-cis content, e.g., a 1,4-cis content of at least 80%, at least 85% or at least 90%. In another embodiment, the curable rubber composition is comprised of at least one styrene/butadiene rubber, in particular a solution polymerized styrene/butadiene rubber. The bound styrene content of such a copolymer may be from 15 to 30% by weight, for example. The curable rubber composition may comprise both types of diene elastomer, e.g., at least one high 1,4-cis content polybutadiene and at least one solution-polymerized styrene/butadiene rubber. The content of high 1,4-cis butadiene rubber may be, for example, from 15 to 35 phr and the content of solution-polymerized styrene/butadiene rubber may be, for example, from 65 to 85 phr.

Reinforcing Filler

One or more reinforcing fillers are also present in the curable compositions of the present invention. According to one aspect, the reinforcing filler may comprise a reinforcing inorganic filler in a mass fraction of from 50% to 100% (based on the total weight of reinforcing filler). As used herein, the term "reinforcing inorganic filler" is understood to mean an inorganic or mineral filler, whatever its color or origin (natural or synthetic). Such reinforcing inorganic fillers may be referred to by persons working in the field as "white" filler or sometimes "clear" filler, to distinguish them from carbon black (which is also considered a reinforcing filler, but not a reinforcing inorganic filler). Such an inorganic filler is capable, without any other means except possibly an intermediate coupling agent, of reinforcing a rubber composition intended for the manufacture of tires. That is, it is capable of replacing a conventional tire grade carbon black in its reinforcing function.

In one embodiment, the curable composition contains at least one silica reinforcing filler. Advantageously, the entirety or at least the majority of the reinforcing inorganic filler is a silica filler. In another embodiment, the curable composition contains at least one carbon black reinforcing filler. According to still another embodiment, the curable compositions contains both at least one silica reinforcing filler and at least one carbon black reinforcing filler. In still other aspects, the reinforcing filler component of the curable rubber composition comprises a blend of reinforcing inorganic filler (e.g., silica) with carbon black, wherein the mass fraction of carbon black in the reinforcing filler may be not more than 30%.

Examples of reinforcing fillers that may be included in the rubber compositions according to certain embodiments of the present invention include pyrogenic silica fillers and precipitated finely-divided silicas typically employed for rubber compounding. The silica filler, however, is preferably of the type obtained by precipitation from a soluble silicate, such as sodium silicate. For example, silica fillers produced according to the method described in U.S. Pat. No. 2,940,830 may be used. These precipitated, hydrated silica pigments have a $SiO_2$ content of at least 50% and usually greater than 80% by weight on an anhydrous basis. The silica filler may have an ultimate particle size in the range of from about 50 to 10,000 angstroms, preferably between 50 and 400 and, more preferably, between 100 and 300 angstroms. The silica may have an average ultimate particle size in a range of about 0.01 to 0.05 microns as determined by electron microscope, although the silica particles may even be smaller in size. The BET surface area of the filler as measured using nitrogen gas is preferably in the range of 40 to 600 square meters per gram, preferably 50 to 300 square meters per gram. The BET method of measuring surface area is described in the Journal of the American Chemical Society, Vol. 60, pages 309-319 (1938). The silica also may have a dibutyl (DBP) absorption value in a range of about 200 to about 400, with a range of from about 220 to 300 being preferred.

Various commercially available silicas and carbon black may be used as reinforcing fillers in various embodiments of the present invention. For example, silicas commercially available from PPG Industries under the Hi-Sil trademark such as, for example, those with designations 210, 243, etc.; silicas available from Rhone-Poulenc, with designations of Z1165MP and Z165GR and silicas available from Degussa AG with designations VN2 and VN3, etc. The Rhone-Poulenc Z1165MP silica is a preferred silica which is reportedly characterized by having a BET surface area of about 160470 and by a DBP value of about 250-290 and by having a substantially spherical shape. Representative examples of carbon blacks include N110, N121, N220, N231, N234, N242, N293, N299, S315, N326, N330, N332, N339, N343, N347, N351, N358, N375, N539, N550, N582, N630, N642, N650, N683, N754, N762, N765, N774, N787, N907, N908, N990 and N991.

According to one embodiment of the invention, the curable rubber composition is comprised of 40 to 100 phr reinforcing filler. Typically, silica is present in the curable rubber composition in an amount of from 5 phr to 120 phr (e.g., 40 phr to 100 phr). The curable rubber composition may comprise, for example, from 0 phr to 30 phr carbon black.

Other types of exemplary reinforcing fillers suitable for use in the present invention include, but are not limited to, aluminas, aluminum hydroxides, carbon blacks modified by silica, and the like. Suitable alumina reinforcing fillers include, for example, highly dispersible alumina having a BET surface area from 30 to 400 $m^2/g$, or between 60 and 250 $m^2/g$, an average particle size of at most 500 nm, or an average particle size of at most 200 nm.

The reinforcing filler, in particular the reinforcing inorganic filler, may be in any desired or advantageous physical state such as, for example, a powder, micro-beads, hollow beads, granules, balls, spheres, irregular granules, high aspect particles or the like or a combination of such physical states.

Curative System

Curable rubber compositions in accordance with the present invention further comprise one or more substances capable of effecting the desired crosslinking (curing, vulcanization) of the diene elastomer(s) when the curable rubber composition is heated. Such a substance or combination of substances is referred to herein as the "curing system." Any of the conventional sulfur-based vulcanizing agents such as, for example, sulfur donors, may be employed, for example. Examples of sulfur donors include elemental sulfur (free sulfur) and organosulfur compounds such as amine disulfides, polymeric polysulfides, and sulfur olefin adducts and combinations thereof. One or more curing aids, activators and/or accelerators (such as thiazoles and sulfenamides, e.g., N-tertiary butyl-2-benzothiazole sulfenamide, also known as TBBS) may also be present such as, for example, zinc oxide and/or fatty acid (e.g., stearic acid). Curing systems based on peroxides or metal oxides may also be utilized.

Other Components

In addition to the aforementioned components, curable rubber compositions in accordance with the present invention may comprise one or more further additives, including any of the additives known in the curable rubber and tire tread art. Such additional optional components include, but are not limited to, coupling agents, swelling agents, non-reinforcing fillers, minerals (other than reinforcing fillers), synthetic and natural fibers, plasticizers, pigments (other than reinforcing fillers), antioxidants, antiozonants, waxes, stabilizers, process oils, tackifying agents, peptizers and the like and combinations thereof.

In a desirable embodiment of the invention, the curable composition may additionally comprise one or more coupling agents, in particular one or more silane coupling agents. Compounds capable of reacting with both the surface of a reinforcing filler (e.g., a silica surface and the diene elastomer molecules, are generally referred to by those skilled in the art as coupling agents, or couplers. Such coupling agents, for example, may be premixed, or pre-reacted, with the reinforcing filler or added to the curable composition mix during the diene elastomer/reinforcing filler processing, or mixing, stage. If the coupling agent and reinforcing filler are added separately to the curable composition mix during the diene elastomer/reinforcing filler mixing, or processing stage, it is considered that the coupling agent then combines in situ with the reinforcing filler.

In particular, such coupling agents are generally composed of a silane which has a constituent component, or moiety (the silane portion) capable of reacting with the reinforcing filler (e.g., silica) surface and, also, a constituent component, or moiety, capable of reacting with the diene elastomer(s). In this manner, then the coupler acts as a connecting bridge between the reinforcing filler and the diene elastomer(s) and thereby enhances the reinforcement aspect of the reinforcing filler.

The diene elastomer-reactive group component of the coupler may be, for example, one or more of groups such as mercapto, amino, vinyl, epoxy, and sulfur groups.

Any of the coupling agents known in the art may be employed in the curable compositions of the present invention.

Methods of Preparation

The various components of the curable rubber composition may be combined using adaptations of any suitable compounding method known in the art. For example, the mixing of the ingredients of the curable rubber composition may be done in two steps, first on an internal mixer then on an open roll mill. The first step may comprise a mixing of the diene elastomer(s), reinforcing filler(s) (e.g., silica), styrene/α-methyl styrene resin(s), and (optionally) coupling agent(s) (e.g., silane) with the internal mixer. The ingredients may be added under the following mixing conditions: Rotor Speed=50 rpm, a start temperature=110° C. and maximum blending temperature=140-150° C. When the maximum temperature is reached, the compounded product is removed from the internal mixer for the second mixing step. The sulfur vulcanization agents are then added on the open roll mill at a regulated temperature (e.g., 45° C.) and a speed of 10-20 rpm. After homogenization on the rolls, the curable rubber composition may be calendared to provide sheets (e.g., 2.5 mm in thickness) of the curable rubber composition.

Curing Methods

To cure the curable rubber compositions of the present invention, any of the usual vulcanization or curing processes known in the art may be used such as heating with superheated steam or hot air in a press or mold. Accordingly, the curable rubber composition may be cured by a process comprising heating the curable rubber composition, which may be molded into a desired form, at a temperature and for a time effective to cure the diene elastomer(s).

Uses

Particular embodiments of the present invention include treads that are intended for passenger-car or light truck tires but the invention is not limited only to such tires. It is noted that the particular embodiments of the tread of the present invention are intended to be fitted on motor vehicles (including passenger vehicles) or non-motor vehicles such as bicycles, motorcycles, racing cars, industrial vehicles such as vans, heavy vehicles such as buses and trucks, off-road vehicles such as agricultural, mining, and construction machinery, aircraft or other transport or handling vehicles.

The curable rubber composition disclosed herein may be used for various rubber products such as a tread compound, undertread compound, sidewall compound, wire skim compound, inner liner compound, bead, apex, any compound used in a tire carcass, including carcass reinforcement and in other components for tires, industrial rubber products, seals, timing belts, power transmission belting, and other rubber goods. As such, the present invention includes products made from the curable rubber compositions disclosed herein.

A tread according to certain aspects of the invention, which is suitable for summer use while having in particular an improved combination of both good wet adherence (i.e., grip performance on wet ground) and decreased rolling resistance, may be manufactured using a curable rubber composition according to the invention. A tire according to certain aspects of the invention comprises such a tread.

Within this specification, embodiments have been described in a way which enables a clear and concise specification to be written, but it is intended and will be appreciated that embodiments may be variously combined or separated without departing from the invention. For example, it will be appreciated that all preferred features described herein are applicable to all aspects of the invention described herein.

In some embodiments, the invention herein can be construed as excluding any element or process step that does not materially affect the basic and novel characteristics of the composition or process. Additionally, in some embodiments, the invention can be construed as excluding any element or process step not specified herein.

Although the invention is illustrated and described herein with reference to specific embodiments, the invention is not intended to be limited to the details shown. Rather, various modifications may be made in the details within the scope and range of equivalents of the claims and without departing from the invention.

EXAMPLES

A series of summer tread compounds based on the following general formula was prepared:

| | |
|---|---|
| Butadiene Rubber | 25 phr |
| SBR | 75 phr |
| Silica | 68 phr |
| Silane (50% on carbon black) | 6.8 phr |
| Hydrocarbon Resin | 25 phr |
| Sulfur* | 2.5 phr |
| TBBS* | 2.5 phr |
| Stearic Acid* | 2.5 phr |
| ZnO* | 2.5 phr |

*These components are considered to constitute the curing system.

The following components in particular were employed:
Butadiene Rubber=ND45 (product of Lanxess-Arlanxeo, high cis unsaturation content).
SBR=Buna® VSL5025-0HM polymerized styrene/butadiene rubber (product of Lanxess-Arlanxeo, 25% bound styrene and 50% vinyl content).
Silica=Z1165MP silica (product of Solvay Silica)
Hydrocarbon resin=variable, as follows:

Example 1 (Inventive)

a styrene/α-methyl styrene copolymer having a ring and ball softening point of 46° C. and a weight average molecular weight of about 1050 g/mol, in accordance with the invention.

Example 2 (Comparative)

Cleartack® W 85 hydrocarbon resin (product of Cray Valley), having a ring and ball softening point of about 85° C. and a weight average molecular weight of about 1400 g/mol.

Example 3 (Comparative)

Cleartack® W 100 hydrocarbon resin (product of Cray Valley), having a ring and ball softening point of about 100° C. and a weight average molecular weight of about 1700 g/mol.

Example 4 (Comparative)

Cleartack® W 130 hydrocarbon resin (product of Cray Valley), having a ring and ball softening point of about 130° C. and a weight average molecular weight of about 2000 g/mol.

The uncured rubber blends were prepared in accordance with the following procedure:

Step 1: The components are blended on an internal mixer. In a first pass, the high cis butadiene rubber, SBR, silica, hydrocarbon resin and silane are mixed using a rotor speed of 50 rpm, a start temperature of 110° C., and a min-max blending temperature of 145° C. In a second pass, the components of the curing stem (sulfur, TBBS, stearic acid, ZnO) are mixed with the blend from the first pass at a maximum temperature of 130° C.

Step 2: The uncured rubber blend is calendared on an open mill mixer.

Sheets of the uncured rubber blends which are 2 mm in thickness were cured at 160° C. under pressure and their dynamic properties evaluated using a DMA (Dynamic Mechanical Analysis) apparatus. The value of Tan D at 60° C. was measured and used as an indicator to evaluate the rolling resistance of the cured sheets. A lower Tan D value at 60° C. is indicative of better rolling resistance properties. The results obtained are shown in Table 1.

TABLE 1

| Example | Mw of Hydrocarbon Resin, g/mol | Ring and Ball Softening Point of Hydrocarbon Resin, ° C. | TanD at 60° C. |
|---|---|---|---|
| 1 | 1050 | 46 | 0.093 |
| 2 | 1400 | ca. 85 | 0.103 |
| 3 | 1700 | ca. 100 | 0.108 |
| 4 | 2000 | ca. 130 | 0.115 |

Figure 2:
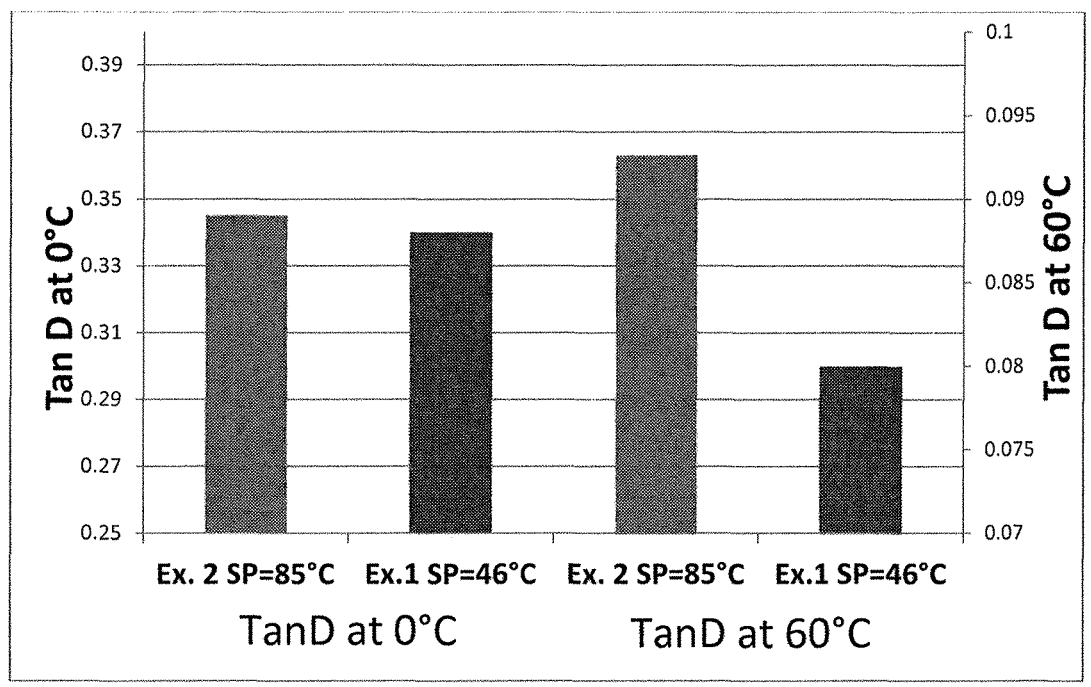
FIG. 2 is a bar chart which compares the Tan D values at 0° C. and 60° C. for cured rubber blends containing hydrocarbon resins having different ring and ball softening points, as further explained in the Examples.

As shown in FIG. 1, a decrease in ring and ball softening point leads to a decrease in Tan D at 60° C., resulting in a better (lower) rolling resistance for a tire having a tread comprised of the cured composition. To confirm the better hysteresis, the weight traction of the cured rubber prepared from the curable composition in accordance with the present invention (containing a low molecular weight styrene/α-methyl styrene co-oligomer having a ring and ball softening point of 46° C.) is compared to that of a cured rubber prepared from an analogous curable composition containing a resin having a ring and ball softening point of 85° C., as illustrated in FIG. 2. Compared to Cleartack® W85 resin, the use of low molecular weight styrene/α-methyl styrene co-oligomer having a ring and ball softening point of 46° C. provides a 15% improvement in rolling resistance with no negative impact in wet adherence/breaking.

What is claimed is:

1. A curable rubber composition comprising:
    a) at least one diene elastomer;
    b) at least one reinforcing filler;
    c) at least one styrene/α-methyl styrene co-oligomer having a number average molecular weight of from about 300 to about 600 g/mol and a ring and ball softening point not greater than 50° C.;
    d) a curative system capable of curing the curable rubber composition when heated;
    wherein at least one of condition i) or condition ii) is met:
        i) the ring and ball softening point of the at least one styrene/α-methyl styrene co-oligomer is at least 25° C.; or
        ii) the at least one styrene/α-methyl styrene co-oligomer has a glass transition temperature not greater than 15° C. as measured by ISO 11357-2.

2. The curable rubber composition of claim 1, wherein the at least one diene elastomer is selected from the group consisting of polybutadienes, polyisoprenes, copolymers of butadiene and vinyl aromatic monomers, copolymers of isoprene and vinyl aromatic monomers, and combinations thereof.

3. The curable rubber composition of claim 1, wherein the at least one reinforcing filler includes at least one of silica and carbon black.

4. The curable rubber composition of claim 1, additionally comprising at least one silane.

5. The curable rubber composition of claim 1, wherein the ring and ball softening point of the at least one styrene/α-methyl styrene co-oligomer is at least 25° C.

6. The curable rubber composition of claim 1, wherein the curative system is comprised of at least one of elemental sulfur, organosulfur compounds and combinations thereof.

7. The curable composition of claim 6, wherein the curative system is additionally comprised of an accelerator, curing aid or activator or a combination thereof.

8. The curable rubber composition of claim 1, wherein the curable rubber composition is comprised of from 5 to 50 parts by weight of the at least one styrene/α-methyl styrene co-oligomer per 100 parts by weight of the at least one diene elastomer.

9. The curable rubber composition of claim 1, wherein the at least one styrene/α-methyl styrene co-oligomer is comprised of from 30 to 70% by weight styrene and from 30 to 70% by weight α-methyl styrene, the amounts of styrene and α-methyl styrene totaling 100% by weight.

10. The curable rubber composition of claim 1, wherein the at least one styrene/α-methyl styrene co-oligomer has a number average molecular weight of from about 350 to about 500 g/mol.

11. The curable rubber composition of claim 1, wherein the at least one styrene/α-methyl styrene co-oligomer has a weight average molecular weight of from about 600 to about 1300 g/mol.

12. The curable rubber composition of claim 1, wherein the at least one styrene/α-methyl styrene co-oligomer has a glass transition temperature not greater than 15° C. as measured by ISO 11357-2.

13. The curable rubber composition of claim 1, wherein the at least one styrene/α-methyl styrene co-oligomer has a polydispersity of from 1 to about 1.5.

14. The curable rubber composition of claim 1, wherein the at least one styrene/α-methyl styrene co-oligomer has a polydispersity of from 1 to about 1.3.

15. The curable rubber composition of claim 1, wherein the at least one styrene/α-methyl styrene co-oligomer has been prepared by cationic or anionic polymerization.

16. A cured composition obtained by curing of the curable rubber composition of claim 1.

17. A tread, comprising the cured composition of claim 16.

18. A tire, comprising the tread of claim 17.

19. A method of making a tread, comprising molding and curing the curable rubber composition of claim 1.

20. A method of decreasing the rolling resistance of a tire having a tread, wherein the tread is obtained by curing a curable rubber composition comprised of at least one diene elastomer, at least one reinforcing filler and a curative system, wherein the method comprises additionally including in the curable rubber composition an effective amount of at least one styrene/α-methyl styrene co-oligomer having a number average molecular weight of from about 300 to about 600 g/mol and a ring and ball softening point of not greater than 50° C. and wherein at least one of condition i) or condition ii) is met:
    i) the ring and ball softening point of the at least one styrene/α-methyl styrene co-oligomer is at least 25° C.; or
    ii) the at least one styrene/α-methyl styrene co-oligomer has a glass transition temperature not greater than 15° C. as measured by ISO 11357-2.

* * * * *